United States Patent
Rolleston et al.

(10) Patent No.: US 8,736,601 B2
(45) Date of Patent: May 27, 2014

(54) METHOD AND SYSTEM FOR PROVIDING VIRTUAL RENDERING ALERTS FOR RENDERING JOB PAGE EXCEPTIONS

(75) Inventors: Robert J Rolleston, Rochester, NY (US); Jeffrey D Kingsley, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 780 days.

(21) Appl. No.: 12/900,035

(22) Filed: Oct. 7, 2010

(65) Prior Publication Data
US 2012/0086704 A1    Apr. 12, 2012

(51) Int. Cl.
*G06T 15/00* (2011.01)

(52) U.S. Cl.
USPC .............................. 345/419; 345/418; 345/420

(58) Field of Classification Search
None
See application file for complete search history.

(56) References Cited

U.S. PATENT DOCUMENTS

| | | | |
|---|---|---|---|
| 6,546,397 B1 * | 4/2003 | Rempell | 1/1 |
| 8,253,559 B2 * | 8/2012 | Howard et al. | 340/539.32 |
| 2006/0114490 A1 | 6/2006 | Rolleston | 358/1.14 |
| 2007/0268513 A1 | 11/2007 | Enloe | 358/1.15 |
| 2009/0222724 A1 | 9/2009 | Stewart et al. | 715/277 |
| 2010/0026711 A1 * | 2/2010 | Muramoto | 345/619 |
| 2010/0164863 A1 * | 7/2010 | Tunick et al. | 345/156 |
| 2011/0012929 A1 * | 1/2011 | Grosz et al. | 345/661 |

\* cited by examiner

*Primary Examiner* — Said Broome
(74) *Attorney, Agent, or Firm* — Kermit D. Lopez; Luis M. Ortiz; Ortiz & Lopez, PLLC (57) ABSTRACT

A method and system for providing a virtual rendering alert with respect to a rendering job page exception. A realistic virtual three-dimensional rendering model with respect to the rendering job can be rendered utilizing a virtual rendering unit. One or more multi-media aspects can be added with respect to an anomalous object in the rendering job to automatically identify a page exception in the rendering job. A list of objects associated with the rendering job can be activated within a scene based on a set of print policies and/or production cost structures at the discretion of a user. A virtual clue can also be presented along with the realistic virtual rendering model in order to provide additional information with respect to the object in the rendering job and thereby effectively identify the rendering job exception.

20 Claims, 10 Drawing Sheets

METHOD AND SYSTEM FOR PROVIDING VIRTUAL RENDERING ALERTS FOR RENDERING JOB PAGE EXCEPTIONS

TECHNICAL FIELD

Embodiments are generally related to print production shops. Embodiments are also related to DPV (Document Production Visualization) systems and methods. Embodiments are additionally related to the provision of virtual rendering alerts in the context of print production shops and related applications.

BACKGROUND OF THE INVENTION

Document production environments, such as networked or non-networked print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions. Print shops and devices within such shops may communicate with one another by way of a network.

Networked rendering devices, such as, printers, can interact with an assemblage of other rendering devices, client devices, servers, and other components that are connected to and communicate over a network in the context of such print shop production environments. Networked rendering devices can be communicatively linked with a client device, for example, in order to provide various operations such as, for example, printing, inserting, finishing and other operations within the network. The networked rendering devices can be generally adapted to render high volumes of documents (e.g., a rendering job) with a special finishing feature such as, for example, a binding feature and a formatting feature.

A job definition format (JDF) and/or a job management format (JMF) are used to define the rendering job along with one or more component/piece specifications such as, for example, special inserts, fold-outs, pockets, tabs, and colored stock with respect to the rendering device. Such component specifications can be employed to understand production cost with respect to the rendering document and to improve the efficiency of the document production process. A text-based system can be conventionally employed for discerning the component specifications with respect to the rendering devices. The component specifications can be typically represented as a textual description of a job assembly process and/or represented as a visual icon of the pages with respect to the rendering job. Such conventional approaches are however unable to explicitly provide a virtual three-dimensional (3D) rendering alert with respect to the completed rendering job.

Figure 1:
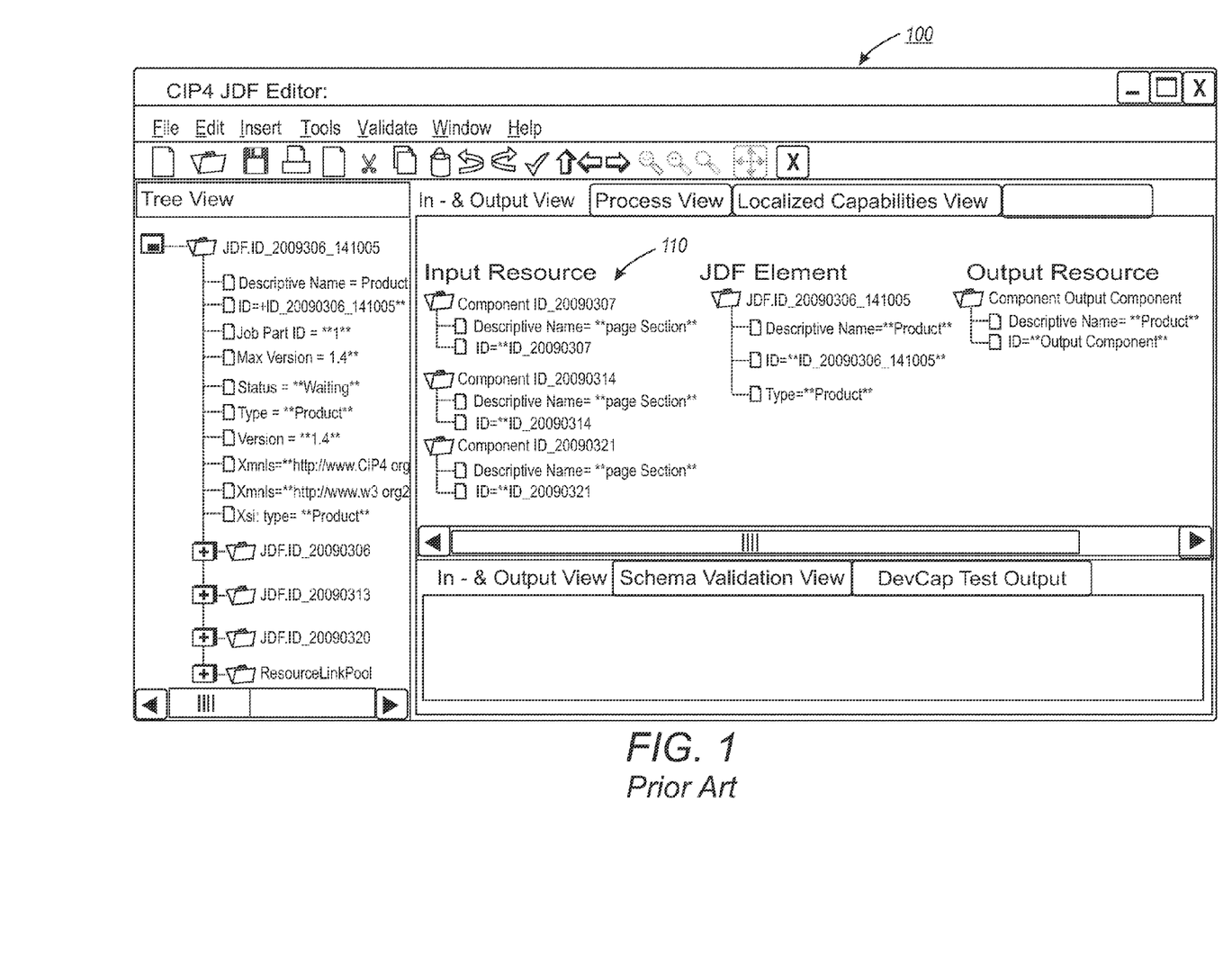
FIG. 1 illustrates a GUI illustrating a prior art job definition format (JDF) editor with respect to a virtual three-dimensional rendering system.

A virtual three-dimensional rendering system can be employed to generate a virtual rendering alert with respect to a completed rendering job within the network. The component specifications can be represented as an iconic representation such as, for example, 'printer spread' and/or 'reader spread' view so that a thumbnail page image can be moved or sorted. FIG. 1 illustrates, for example, a GUI illustrating a prior art JDF editor 100 with respect to a virtual three-dimensional rendering system. As indicated in the example shown in FIG. 1, the JDF editor 100 can upload a rendering job, and specify one or more features with respect to the rendering job and then navigate the rendering job to observe specified features in the rendering job. Such an approach, while advantageous in some situations, still requires additional software application to view the rendering job with respect to the rendering device (e.g., printer, etc.).

Figure 2:
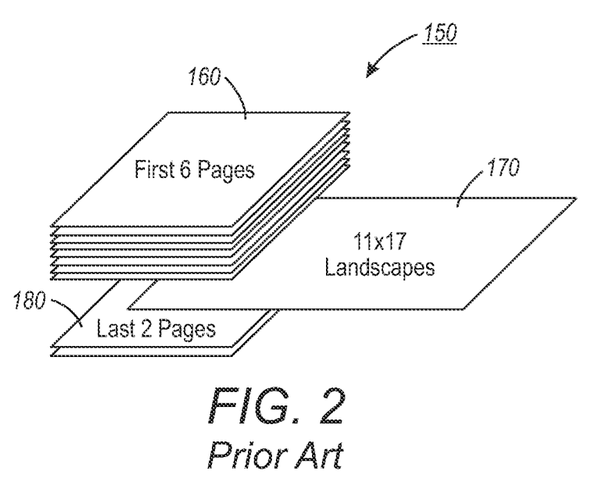
FIG. 2 illustrates a perspective view of a prior art physical product model (PM) with respect to a rendering job.

FIG. 2 illustrates a perspective view of a physical product model (PM) 150 with respect to the rendering job. The physical product model 150 generally includes one or more sections such as, for example, portrait modes 160 and 180 and a landscape mode 170. The job editor 100 creates one or more "page sections" with respect to the sections 160, 180 and 170 in the product model 150 that are represented as different "Input Resource Components" 110 in the JDF editor 100. Such "page sections" may cause a page exception during an assembly process. The sections 160, 170 and 180 can further create different "blocks" within the virtual rendering system. Prior art approaches are unable to identify and present such page exceptions and blocks in the rendering device. They are currently presented as 'page spreads' or 'printer spreads', or even as textual descriptions within the job definition. Additionally, such virtual rendering systems are unable to visually represent additional information in order to highlight the media differences and/or special inserts with respect to the media aspects of the rendering job.

Based on the foregoing, it is believed that a need exists for an improved document production visualization (DPV) method and system. A need also exists for an improved method for providing a virtual (3D) rendering alert with respect to a rendering job page exception, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved DPV method and system.

It is another aspect of the disclosed embodiments to provide for an improved method and system for handling a rendering job page exception.

It is further aspect of the present invention to provide for an improved method for providing a virtual three-dimensional rendering alert with respect to a rendering job page exception.

The aforementioned aspects and other objectives and advantages can now be achieved as described herein. A method and system for providing a virtual rendering alert with respect to a rendering job page exception is disclosed herein. A realistic virtual three-dimensional (3D) rendering model with respect to the rendering job (e.g., a finished document) can be rendered utilizing a virtual rendering unit (e.g., a document production visualization unit). One or more multi-media aspects can be added with respect to an anomalous object (e.g., a block boundary, an input resource component and/or a section) in the rendering job to automatically identify a page exception in the rendering job. A list of objects associated with the rendering job can be activated within a scene based on a set of print policies and/or production cost structures at discretion of a user (e.g., a print controller). A virtual clue can be presented along with the realistic virtual rendering model in order to provide additional information with object in the rendering job and to effectively identify the rendering job exception.

The media aspects associated with the anomalous objects can be represented utilizing a visual effect (e.g., a semi-transparent sheet, a sticky note and/or a pointer) with respect to the page exception in the rendering job. The virtual clues can be locally provided via a digital animation (e.g., a lighting effect and/or a sound effect) with respect to the anomalous object. The virtual clues can be also extended beyond the physical bounds of the object within the scene. Each object in the list of anomalous objects can be represented with different media aspects and virtual clues that can be activated when the object is explicitly selected via a pointing device (e.g., mouse or gesture "roll over"). The objects can be also activated from a pre-defined list of attributes in order to highlight and/or alert with respect to the page exception in the rendering job. The list of objects can be displayed at a user interface of a customer device/rendering device via a pop-up window and/or a tree graph. The virtual alerts with respect to the rendering job exceptions can be provided via a pop-up message, an animation, a pulsating/self-luminous line, a tactile and/or an audio signal. Such a method and system virtually alerts the user with respect to the page exceptions in a wide range of rendering applications.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the present invention can be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.) The computer program code, however, for carrying out operations of the present invention may also be written in conventional procedural programming languages, such as the "C" programming language or in a visually oriented programming environment, such as, for example, VisualBasic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The invention is described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 3:
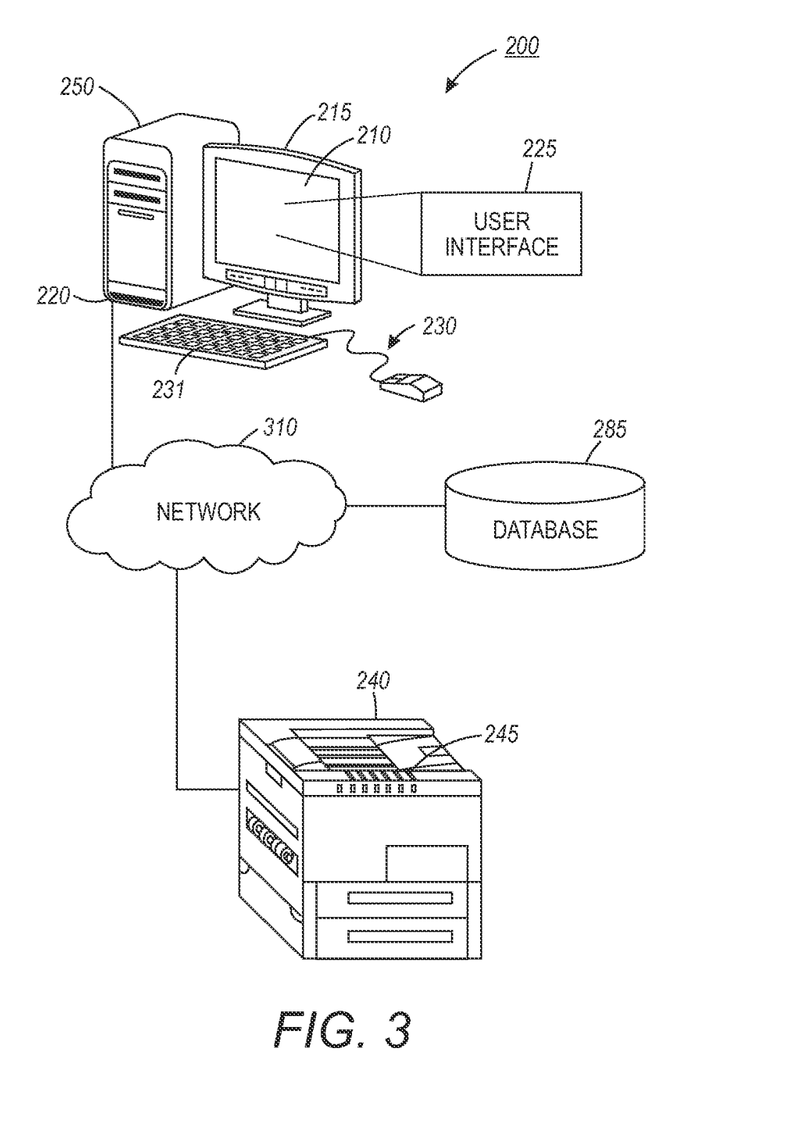
FIG. 3 illustrates an example of a rendering device coupled to a data-processing apparatus through a network, in accordance with the disclosed embodiments.

Referring to FIG. 3, a system 200 is disclosed, which includes a rendering device 240 coupled to a data-processing apparatus 210 through a network 310. In some embodiments, rendering device 240 may be a rendering device such as a printer, copy machine, workstation, mobile display, or a combination thereof. The data-processing apparatus 210 may be, for example, a personal computer or other computing device, and generally includes a central processor 220, a display device 215, a keyboard 231, and a pointing device 230 (e.g., mouse, track ball, pen device, touch, tactile, haptic, or the like). Additional input/output devices, such as the rendering device 240 may be included in association with the data-processing apparatus 210 as desired.

Figure 4:
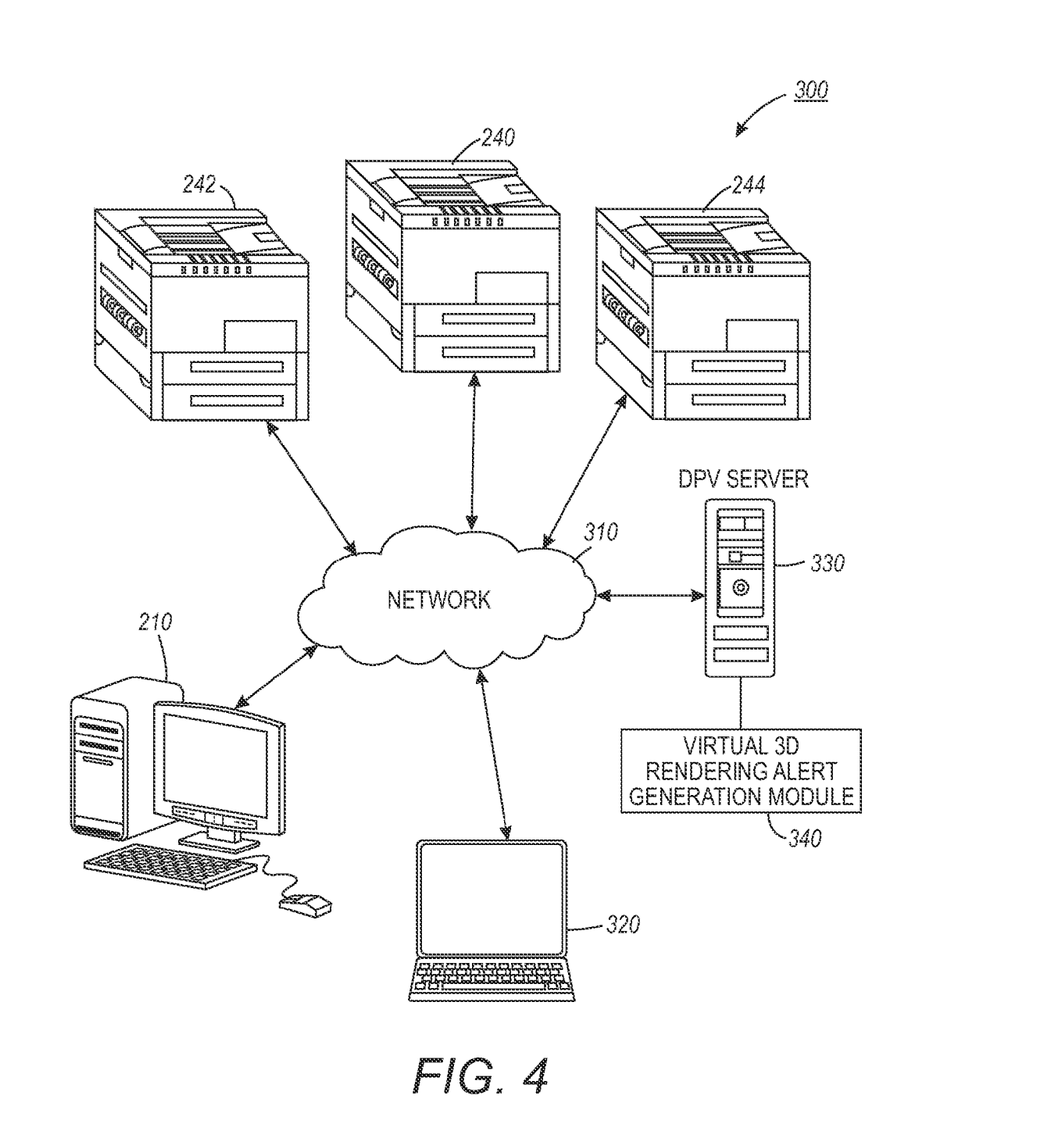
FIG. 4 illustrates a graphical representation of a document production visualization (DPV) system associated with a network, in accordance with the disclosed embodiments.

Note that as utilized herein, the term "rendering device" may refer to an apparatus or system such as a printer, fax machine, copy machine, etc., and/or a combination thereof (e.g., a Multi-Function Device). Preferably, rendering device 240 is capable of multiple rendering functions such as printing, copying, faxing, etc. In some embodiments, the rendering device 240 may be implemented with a single rendering function such as printing. In other embodiments, the rendering device 240 can be configured to provide multiple rendering functions, such as faxing, printing and copying. Note that the rendering devices 242 and 244 illustrated herein with respect to FIG. 4 are generally analogous or similar to rendering device 240. Rendering devices 240, 242, and 244 can include devices which can staple, bind, finish, insert, folder, etc., in addition to basic rendering functions such as printing, scanning, copying, faxing and so forth.

Note that the systems 200, 300 and 400 depicted herein with respect to FIGS. 2, 3, and 4 can be implemented in the context of a print production shop or a similar "print shop" environment. One example of a print product shop or a print shop environment is disclosed in U.S. Pat. No. 7,791,152, entitled "Dynamic Offer Generation Based on Print Shop Machine Load," which issued to Reiner Eschbach on Sep. 7, 2010 and is incorporated herein by reference in its entirety. Another example of a print production shop or a print shop environment is disclosed in, for example, U.S. Pat. No. 7,430,056, entitled "System and Method of Evaluating Print Shop Consolidation Options in an Enterprise," which issued to Rai et al on Sep. 30, 2008 and is incorporated herein by reference in its entirety. A print shop environment may be, for example, a single entity or business enterprise or may be a variety of different types of print shop production systems from different entities that communicate with another via a distributed computer network, depending upon design considerations. A further example of a print production shop or a print shop environment in which embodiments may be implemented is described in U.S. Patent Application Publication No. 20060114490, entitled "System and Method for Document Production Visualization," which published on Jun. 1, 2006 and which is incorporated herein by reference in its entirety.

The data-processing apparatus 210 shown in FIG. 3, for example, can be coupled to the rendering device 240 (and/or other rendering devices) through a computer network 310 in the context of a print shop environment. Network 310 may employ any network topology, transmission medium, or network protocol. The network 310 may include connections, such as wire, wireless communication links, or fiber optic cables. In the depicted example, network 310 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The rendering device 240 can include the use of a user interface 225, such as a panel menu. The panel menu may be used to select features and enter other data in the rendering device 240. Such interfaces may include, for example, touch screens having touch activated keys for navigating through an option menu or the like. A driver program, for example, can be installed on the data-processing apparatus 210 and can reside on the host device's hard drive 250. The driver program may be activated through an application interface so that a user may generate a print job with the driver for processing by the rendering device 240.

The data-processing apparatus 210 also includes a GUI 225 that allows a user to interact with the data-processing apparatus 210 and also the network 310 and networked devices such as the rendering device 240 shown in FIG. 3. The user interface 225 displays information and receives data through device display and/or the keyboard/mouse combination. The interface 225, also serves to display results, whereupon the user may supply additional inputs or terminate a given session. The data-processing apparatus 210 can be, for example, any computing device capable of being integrated within a network, such as a PDA, personal computer, cellular telephone, point-of-sale terminal, server, etc.

The input device of the rendering device 240, for example, may be a local user interface 225, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the present invention, which can be embodied in the context of a data-processing apparatus 210 and rendering device 240 depicted in FIG. 3. The present invention, however, is not limited to any particular application or any particular environment. Instead, those skilled in the art will find that the methods and systems of the disclosed embodiments may be advantageously applied to a variety of system and application software, including database management systems, word processors, and the like. Moreover, the present invention may be embodied on a variety of different platforms, including Macintosh, UNIX, LINUX, and the like.

Therefore, the description of the exemplary embodiments, which follows, is for purposes of illustration and not considered a limitation.

FIG. 4 illustrates a graphical representation of a DPV (Document Production Visualization) system 300 associated with a network 310, in accordance with the disclosed embodiments. The document production visualization system 300 generally includes a network infrastructure such as network 310 that is associated with and/or communicates with one or more networked rendering devices 240, 242 and 244, data-processing system 210, a mobile communication device (e.g., a laptop) 320, a document production visualization (DPV) server 330 and so forth. Data-processing system 210 depicted in FIG. 3 can be, for example, a server. Other devices such as, for example, desktops, network devices, palmtops, mobile phones, etc may also be included in the network 310, as service providers. The rendering devices 240, 242 and 244 can be located remotely with respect to each other, or alternatively, they may be located locally with respect to each other.

The typical rendering device 240 may act as a combination of a printer, photocopier, fax, insert, finish, bind, and e-mail. While three rendering devices 240, 242 and 244 are shown by way of example, it is to be appreciated that any number of rendering devices may be linked to the network, such as four, five, six or more rendering devices. In general, the rendering devices 240, 242 and 244 can be employed to perform a rendering output function (e.g., printing, copying, faxing, inserting, finishing, binding, etc) within a networked environment. Note that rendering devices 240, 242 and 244 are generally analogous to one another.

A virtual three-dimensional (3D) rendering alert generation module 340 associated with the document production visualization server 330 can be adapted for providing virtual three-dimensional rendering alerts with respect to a rendering job exception in the networked rendering device 240, 242 and 244. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as hard disk drives, Flash memory, USB drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

Figure 5:
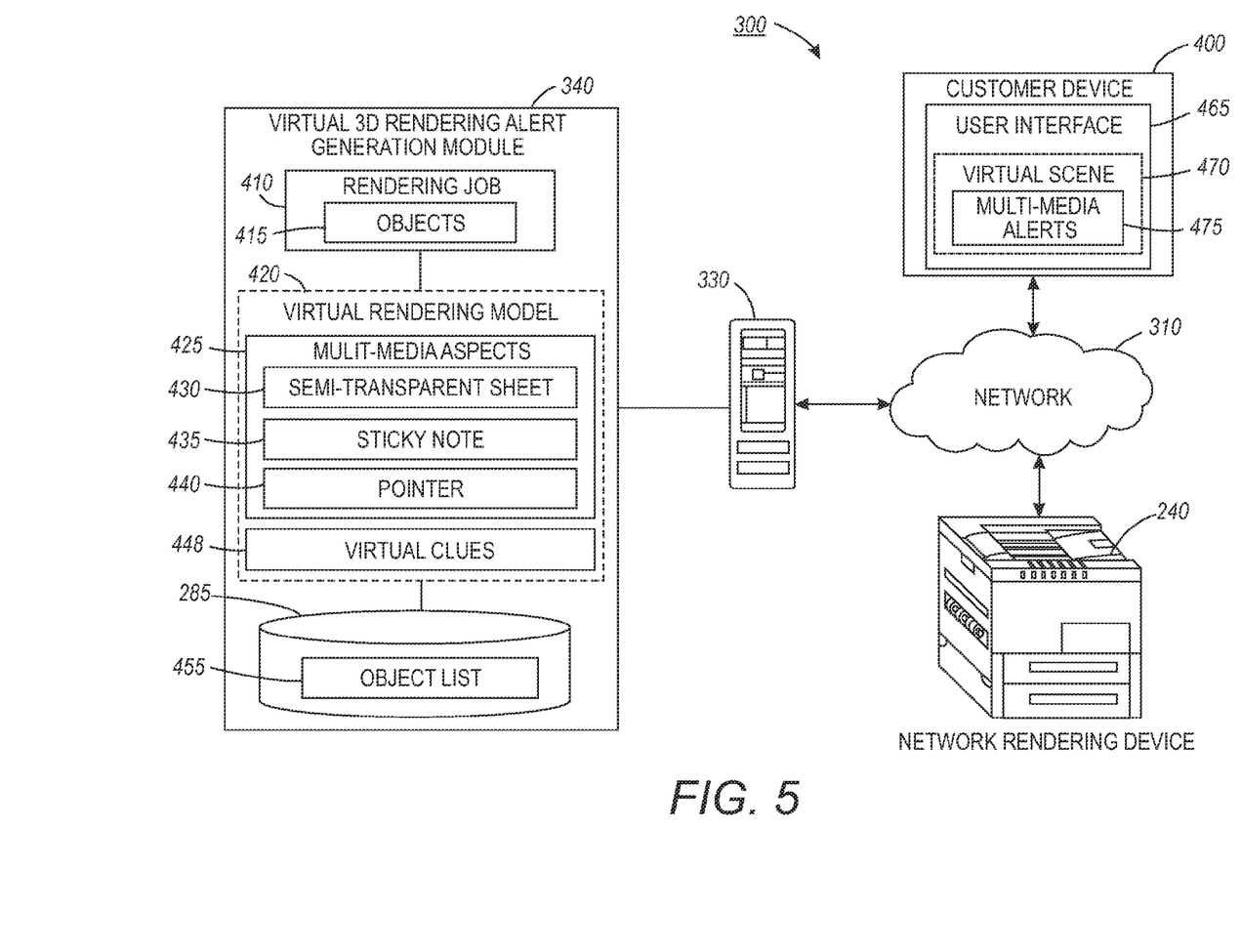
FIG. 5 illustrates a block diagram of the document production visualization system for providing a virtual three-dimensional rendering alert with respect to a page exception in a rendering job, in accordance with the disclosed embodiments.

FIG. 5 illustrates a block diagram of a DPV system 300, in accordance with the disclosed embodiments. The DPV system 300 generally includes a customer device 400 that can communicate with a network 310. A DPV server 330 can also communicate with the network 310. Additionally, a networked rendering device 240 can communicate with the network 310. Thus, the customer device 400 can communicate with the networked rendering device 240 and the DPV server 330 via the network 310. The DPV server 330 can also be configured to include a virtual three-dimensional rendering alert generation module 340 that is operatively configured in association with the network 310.

The DPV system 300 can be implemented in some embodiments as a rendering job exception handling application capable of virtually alerting a user regarding the page exception with respect to a rendering job 410 in a wide range of networked rendering applications. Note that the rendering job exception application is a process of expressing and recording the instructions for deviating from the baseline and/or common job programming for the rendering job 410. The rendering job exception programming can be accomplished in order to unambiguously represent assorted page changes such as, insert sheets, chapter start and/or simple duplex changes, media changes, and anything that requires the manual intervention with respect to the completion of rendering job 410. Such virtual three-dimensional representation of page exceptions can be further adapted for reviewing the job pages and indicating the exception for the specified pages in the rendering job 410.

The virtual three-dimensional rendering alert generation module 340 associated with the DPV server 330 can render a realistic virtual three-dimensional rendering model 420 by adding one or more multi-media aspects 425 with respect to an anomalous object 415 in the rendering job 410 to automatically identify page exceptions in the rendering job 410. The multi-media aspects 425 can be represented utilizing a visual effect such as, a semi-transparent sheet 430, a sticky note 435 and/or a pointer 440 with respect to the object 415. Note that the anomalous object 415 in the rendering job 410 can be an exception location such as, a block boundary, an input resource component and/or a section. The virtual three-dimensional rendering alert generation module 340 further present a virtual clue(s) 448 long with the realistic virtual rendering model 420 in order to provide additional information with respect to the objects 415 in the rendering job 410. A list of objects 455 along with the multi-media aspects 425 and the virtual clues 448 can be stored into the database 285 of the DPV server 330. The list of objects 455 can be further displayed at the user interface 225 and 245 of the customer device 400 and the rendering device 240 respectively via a pop-up window and/or a tree graph.

The DPV server 330 can further generates a multi-media alert 475 in a virtual scene 470 based on a set of print policies and production cost structures that can be displayed at the user interface 225 of the customer device 400 in order to effectively identify or manage the exceptions in the rendering job 410. The multi-media alert is the presentation at the customer device 400 via the user interface 565 of one or more of the multi-media aspects 425 generated by the virtual rendering model 420 provided by the module 340 processed via the server 330.

Note that the customer device 400 disclosed herein can be a data processing system 100 and/or a mobile communication device 320 such as, for example, a print management system, a laptop, a PDA, a mobile device and a Smartphone, etc. One or more multi-media alerts 475 with respect to the exceptions can be provided in the context of, for example, a graphically displayed pop-up message, an animation, a graphical pulsating or self-luminous line, and/or tactile and/or audio signals via, for example the customer device 400.

The virtual three-dimensional alerts 475 in the customer device 400 enable the user of the customer device 400 to inspect the job programming attributes with respect to the rendering job 410. The job programming attributes describe parameters by which the rendering job 410 may be processed and include parameters for page layout (e.g., size, orientation, duplex), color options (e.g., brightness, hue, saturation), media type (e.g. paper, transparency, weight), finishing options (e.g., output tray, collate, staple, binding), and the like.

FIGS. 6-9 illustrate pictorial representations of GUI 500, GUI 550, GUI 600 and GUI 650, which depict implementations of the virtual three-dimensional rendering model 420 including various multi-media aspects, in accordance with the disclosed embodiments. Note that each GUI 500, 550, 600 and/or 650 can be implemented utilizing a user interface such as, for example, the GUI 225 depicted in FIG. 3 herein, and may be provided by a module, such as, for example, module 340 (i.e., a software application). Each GUI 500, 550, 600 and 650 can be displayed via a display device such as display 215 depicted in FIG. 3. In the illustrated figures herein, the depicted GUI 500, 550, 600 and 650 can be implemented in the context of a GUI "window". Note that in computing, a GUI window is generally a visual area containing some type of user interface (e.g., GUI 225). Such a "window" usually (but not always) possesses a rectangular shape, and displays the output of and may allow input to one or more processes. Such windows are primarily associated with graphical displays, where they can be manipulated with a mouse cursor, such as, for example, the pointing device 230 depicted in FIG. 1. A GUI using windows as one of its main "metaphors" is often referred to as a windowing system.

Each object 415 in the list 455 can be represented with different multi-media aspects 425 and virtual clues 445 that can be activated when the object 415 is selected via a pointing device 230 (e.g., mouse or gesture "roll over") of the data processing system 100. The objects 415 can be also activated from a pre-defined list of attributes in order to highlight and/or alert the user with respect to the page exception in the rendering job 410.

TABLE 1

| Active | Page Set | Indicators |
|---|---|---|
|  | Cover | Flash on Rollover |
| X | Title Page | Marquee (Red) |
|  | Chapter1 | Marquee (Green) |
| X | Chapter2 | Outline (Yellow) |
|  | Fold1 | Beep on Rollover |
|  | Chapter2 | Outline (Blue) |

Table. 1 represents an exemplary list of pre-defined page set attributes such as, cover, title page, chapter and fold attributes with respect to the rendering job 410 that can be utilized to virtually highlight the rendering issues within the rendering device 240. The multi-media aspects 425 such as, the transparent sheet, the sticky note and the pointer can be virtually represented with respect to the rendering job 410 based on the object 415. The virtual clues 445 can be locally provided via a digital animation such as, a lighting effect and/or a sound effect with respect to the anomalous object. The virtual clues 445 can be also extended beyond the physical bounds of the object 415 within the virtual scene 470.

Figure 6:
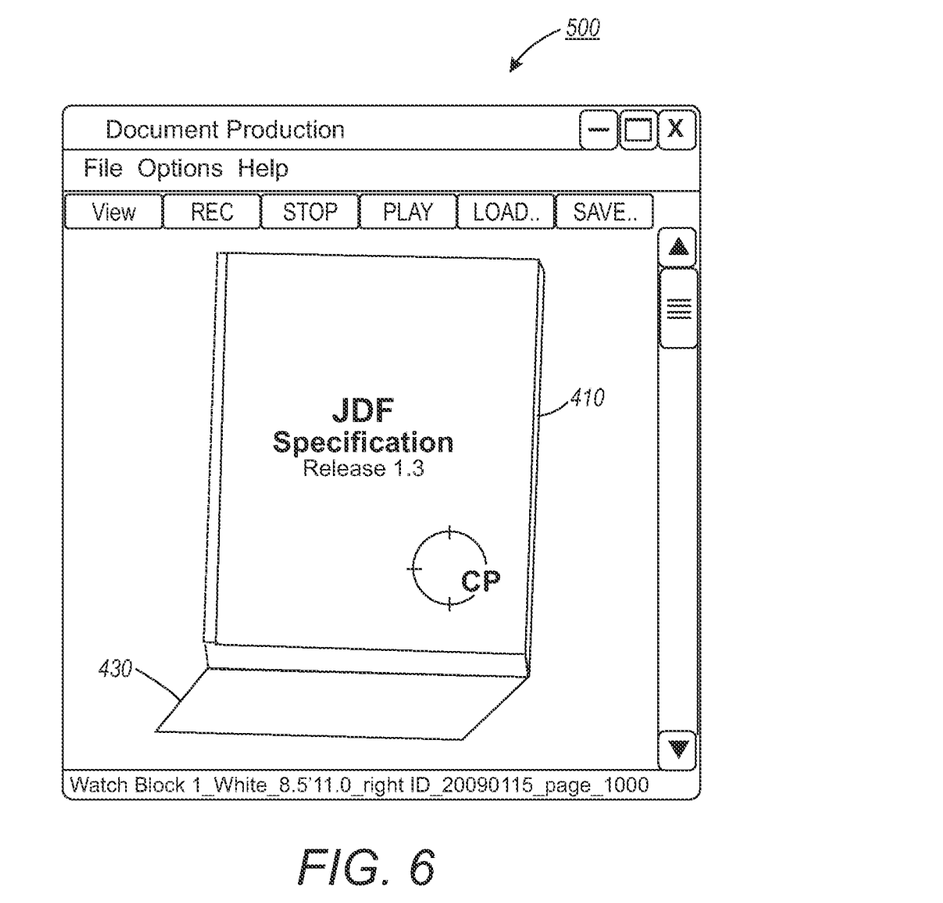
FIGS. 6-9 illustrate a GUI illustrating a virtual three-dimensional rendering model associated with various media aspects, in accordance with the disclosed embodiments.

The multi-media alert 475 (or alerts) can indicate the properties of a boundary block and/or a changed attribute between the boundary blocks with respect to the rendering job 410. Note that the boundary block with respect to the rendering job 410 is created during generation of the JDF or job ticket. The boundary block represents the location of the rendering job 410 where there is a change from one input resource component and/or a section to another. FIG. 6 illustrates a GUI 500 illustrating the virtual three-dimensional rendering model 420 including the semi-transparent sheet 430, in accordance with the disclosed embodiments. The semi-transparent sheet 430 can include a textual representation, which describes the physical boundaries of the rendering job 410 in order to make the page exception visible and selectable.

Figure 7:
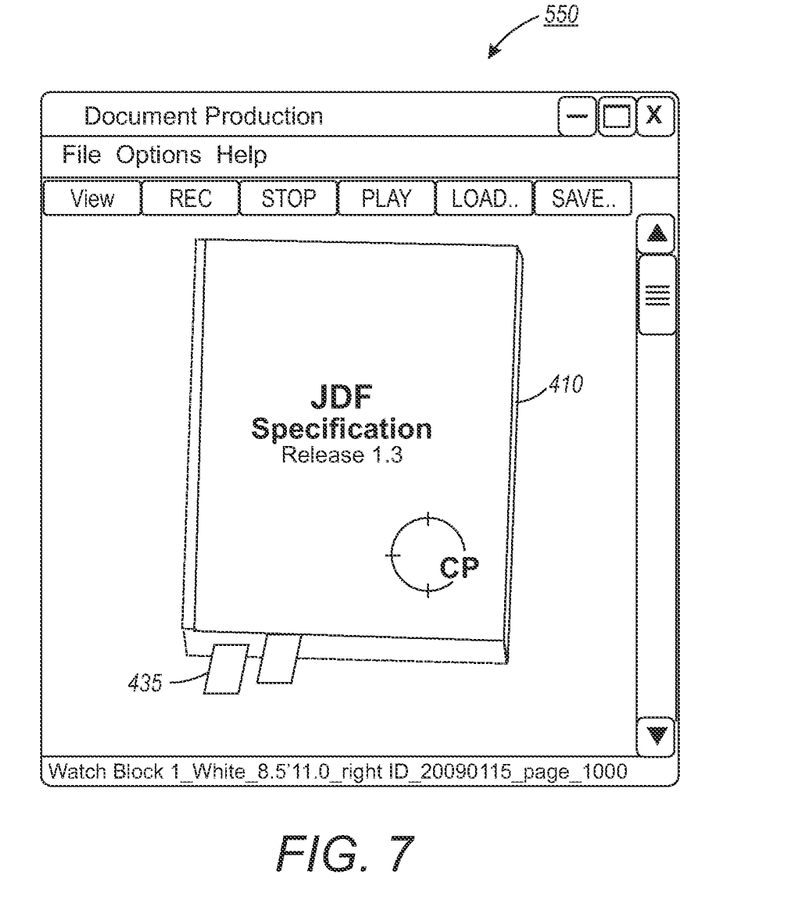

FIG. 7 illustrates a GUI 550 illustrating the virtual three-dimensional rendering model 420 including the sticky note 435, in accordance with the disclosed embodiments. Note that the user interface as utilized herein generally refers to a type of environment that represents programs, files, options and so forth by means of graphically displayed icons, menus, and dialog boxes on a screen. A user can interact with the user interface to select and activate such options by pointing and clicking with a user input device such as, for example, a touch screen, a key board on the like. A particular item can function in the same manner to the user in all applications because the user interface provides standard software routines to identify these elements and reports the user's actions.

Figure 8:
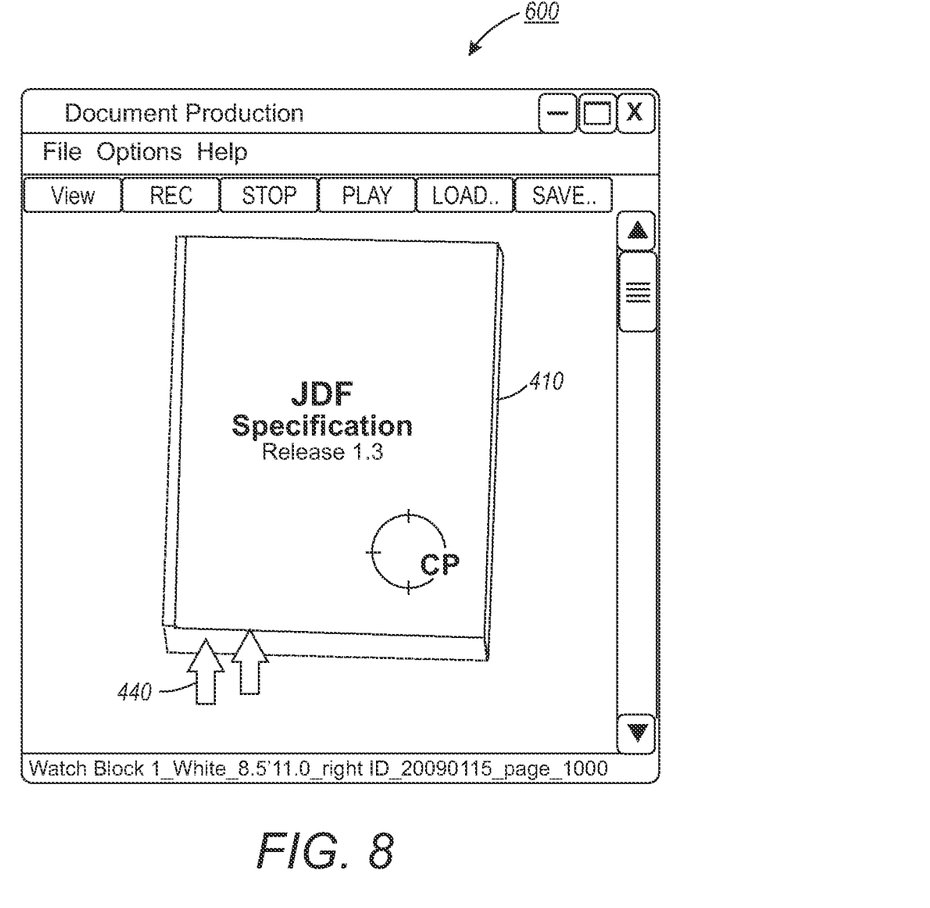

The sticky note 435 includes a textual representation in order to describe the changed property between the rendering jobs 410 in the networked rendering device 140. FIG. 8 illustrates a GUI 600 illustrating the virtual three-dimensional rendering model 420 including the pointers 440, in accordance with the disclosed embodiments. The pointers 440 represent the process of the assorted page change in the rendering job 410 in order to identify page change exceptions with respect to the rendering job 410.

Figure 9:
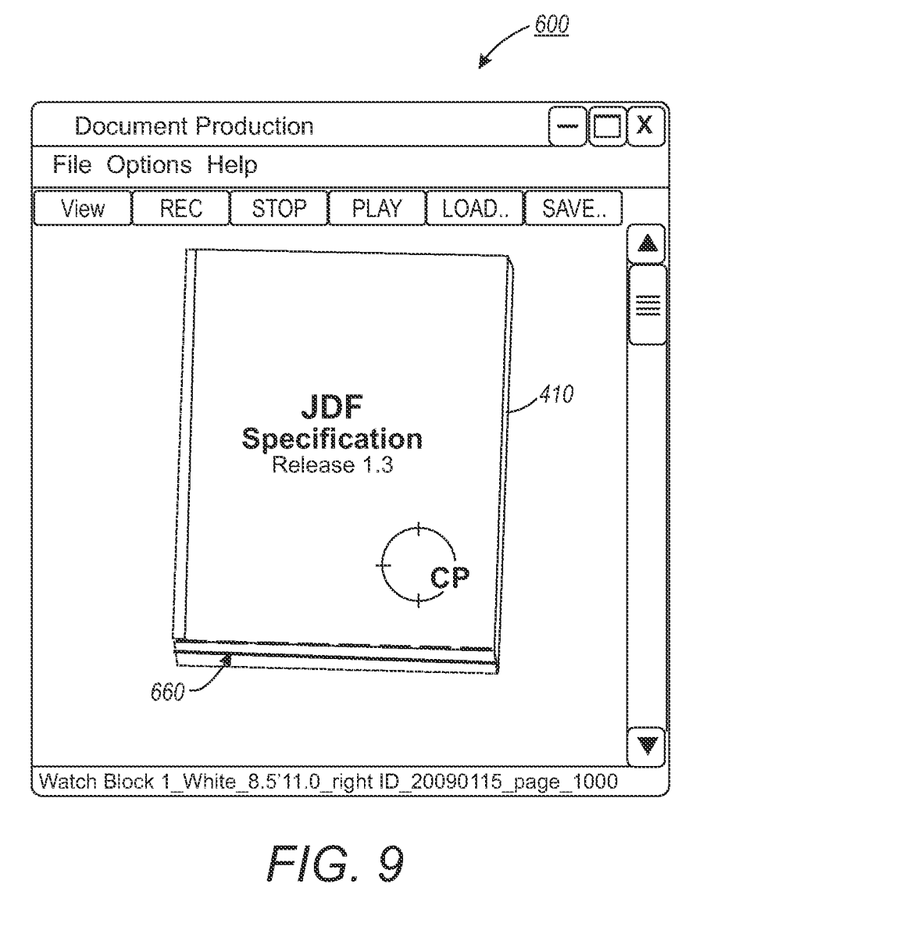

FIG. 9 illustrates a GUI 650 illustrating the virtual three-dimensional rendering model 420 including graphical indicators 660, in accordance with the disclosed embodiments. Again as a reminder, in FIGS. 1-10, identical or similar blocks are generally indicated by identical reference numerals. The graphical indicators 660 can be a digital animation that provides graphical marquee lighting with varying colors in order to represent the page change exceptions in the document production visualization system 300. For example, a cover page in the rendering job 410 can be represented utilizing a flash on rollover, the title page can be represented utilizing a marquee (red), chapters in the rendering job can be represented utilizing varying color marquees such as, a red marquee, a green marquee and a yellow marquee, etc. Such an approach therefore virtually alerts the user with respect to the rendering job exceptions in a wide range of rendering applications.

Figure 10:
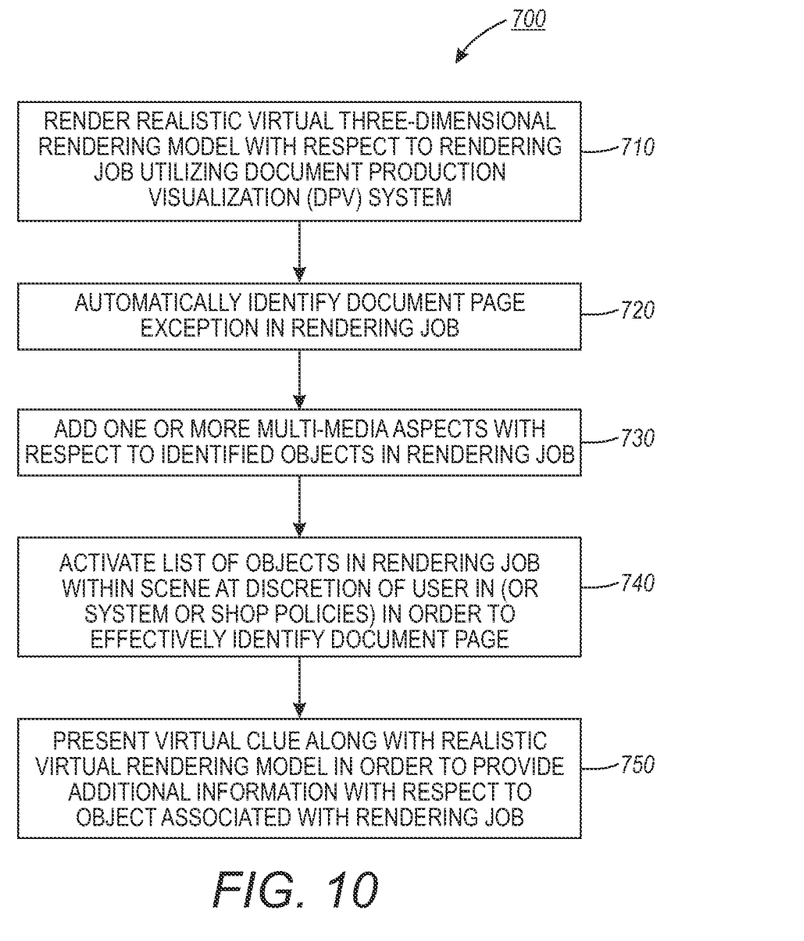
FIG. 10 illustrates a high level flow chart of operations illustrating logical operational steps of a method for providing a virtual three-dimensional rendering alert with respect to the rendering job exception in the rendering job, in accordance with the disclosed embodiments.

FIG. 10 illustrates a high level flow chart of operations depicting logical operational steps of a method 700 for providing virtual three-dimensional rendering alerts 375 with respect to the page exception in the rendering job 410, in accordance with the disclosed embodiments. Note that the method 700 can be implemented in the context of a computer-useable medium that contains a program product, including, for example, a module or group of modules. In general, the realistic virtual three-dimensional rendering model 420 described herein can be rendered with respect to the rendering job 410 such as, a finished document utilizing the virtual three-dimensional rendering alert generation module 340 of the document production visualization server 330.

As indicated at block 710, an operation can be implemented to render a realistic three-dimensional rendering model with respect to a rendering job (or multiple rendering jobs) utilizing a DPV system, such as, for example, the DPV system 300 discussed earlier herein. Thereafter, as depicted at block 720, an operation can be implemented for automatically identifying a document page exception (or multiple document page exceptions) in the rendering job. Next, as described at block 730, an operation can be implemented to add one or more multi-media aspects with respect to identified anomalous objects in the rendering job. Then, as depicted at block 740, an operation can be implemented to activate a list of objects in the rendering job within the scene at the discretion of the user (or system or shop policies) in order to effectively identify the document page. Finally, as indicated at block 750, an operation can be implemented to present one or more visual clues along with the aforementioned "realistic" virtual rendering model in order to provide additional information with respect to one or more objects associated with the rendering job.

Note that programs defining functions with respect to the disclosed embodiments may be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including, for example, Ethernet, the Internet, wireless networks, other networked systems.

The method and system disclosed herein effectively receives, inspects and evaluates the rendering jobs against the user defined page exception rules and generate the page exception programming that can be utilized by an associated raster image process (RIP) and/or a print engine to provide effective rendering solution within the networked rendering system. The integrated list of exception pages and objects of the rendering job can be effectively utilized for reviewing the job programming and/or any other displays that include the job programming effects in a wide range of rendering applications.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for providing a virtual rendering alert with respect to a rendering job page exception, said method comprising:
    generating a three-dimensional virtual rendering model with respect to a rendering job on a graphical user interface utilizing a document production visualization system comprising computer usable program code stored on non-transitory computer readable memory within a virtual rendering unit in order to add at least one multi-media aspect with respect to at least one object associated with said rendering job and automatically identify at least one page exception with respect to said rendering job;
    activating a list of objects with respect to said rendering job within a scene based on a set of print policies or production cost structures at a discretion of a user in order to effectively generate a virtual alert with respect to said page exception; and
    presenting a virtual clue with respect to said at least one object in order to provide additional information with respect to said at least one object of said rendering job and to effectively identify said page exception across a range of rendering applications.

2. The method of claim 1 further comprising representing said at least one media aspect with respect to said at least one object utilizing a visual effect in order to alert said user with respect to said at least one page exception.

3. The method of claim 1 further comprising representing said media aspect utilizing at least one of the following types of visual effects:
    a graphically displayed semi-transparent sheet;
    a graphically displayed sticky note; and
    a graphically displayed pointer.

4. The method of claim 1 further comprising locally providing said visual clue with respect to said at least one object utilizing at least one of the following types of digital animations:
    a lighting effect; and
    a sound effect.

5. The method of claim 1 further comprising configuring said virtual rendering unit to comprise a document production visualization server.

6. The method of claim 1 further comprising explicitly representing said at least one media aspect and said visual clue when an analogous object is selected via a pointing device.

7. The method of claim 1 further comprising activating said analogous object from a pre-defined list of attributes in order to highlight said page exception within said rendering job.

8. The method of claim 1 further comprising graphically displaying said virtual rendering alert with respect to said rendering job at a user interface of a client device utilizing at least one of the following types of displays:
    a graphically displayed pop-up window; and
    a graphically displayed data tree.

9. The method of claim 8 wherein said client device comprises at least one of the following types of devices:
    a data processing system;
    a communications device; and
    a rendering device.

10. A system for providing a virtual rendering alert with respect to a rendering job page exception, said system comprising:
    a document production visualization system comprising computer usable program code stored on non-transitory computer readable memory programmed to complete the steps of:
        generating a three-dimensional virtual rendering model with respect to a rendering job on a graphical user interface utilizing a virtual rendering unit in order to add at least one multi-media aspect with respect to at least one object associated with said rendering job and automatically identify at least one page exception with respect to said rendering job;
        activating a list of objects with respect to said rendering job within a scene based on a set of print policies or production cost structures at a discretion of a user in order to effectively generate a virtual alert with respect to said page exception; and
        presenting a virtual clue with respect to said at least one object in order to provide additional information with respect to said at least one object of said rendering job and to effectively identify said page exception across a range of rendering applications.

11. The system of claim 10 wherein said instructions are further configured for representing said at least one media aspect with respect to said at least one object utilizing a visual effect in order to alert said user with respect to said at least one page exception.

12. The system of claim 10 wherein said instructions are further configured for representing said media aspect utilizing at least one of the following types of visual effects:
 a graphically displayed semi-transparent sheet;
 a graphically displayed sticky note; and
 a graphically displayed pointer.

13. The system of claim 10 wherein said instructions are further configured for locally providing said visual clue with respect to said at least one object utilizing at least one of the following types of digital animations:
 a lighting effect; and
 a sound effect.

14. The system of claim 10 wherein said instructions are further configured for modifying said virtual rendering unit to comprise a document production visualization server.

15. The system of claim 10 wherein said instructions are further configured for representing said at least one media aspect and said visual clue when an analogous object is selected via a pointing device.

16. The system of claim 10 wherein said instructions are further configured for activating said analogous object from a pre-defined list of attributes in order to highlight said page exception within said rendering job.

17. The system of claim 10 wherein said instructions are further configured for graphically displaying said virtual rendering alert with respect to said rendering job at a user interface of a client device utilizing at least one of the following types of displays:
 a graphically displayed pop-up window; and
 a graphically displayed data tree.

18. The system of claim 17 wherein said client device comprises at least one of the following types of devices:
 a data processing system;
 a communications device; and
 a rendering device.

19. A system for providing a virtual rendering alert with respect to a rendering job page exception, said system comprising:
 a document production visualization system comprising computer usable program code stored on non-transitory computer readable memory programmed to complete the steps of:
  generating a three-dimensional virtual rendering model on a graphical user interface with respect to a rendering job utilizing a virtual rendering unit in order to add at least one multi-media aspect with respect to at least one object associated with said rendering job and automatically identify at least one page exception with respect to said rendering job;
  activating a list of objects with respect to said rendering job within a scene based on a set of print policies or production cost structures at a discretion of a user in order to effectively generate a virtual alert with respect to said page exception;
  presenting a virtual clue with respect to said at least one object in order to provide additional information with respect to said at least one object of said rendering job and to effectively identify said page exception across a range of rendering applications; and
  automatically representing said at least one media aspect with respect to said at least one object utilizing a visual effect in order to alert said user with respect to said at least one page exception.

20. The system of claim 19 wherein said instructions are further configured for modifying said virtual rendering unit to comprise a document production visualization server.

* * * * *